US012293466B2

(12) United States Patent
Borovikov et al.

(10) Patent No.: US 12,293,466 B2
(45) Date of Patent: May 6, 2025

(54) SYSTEMS AND METHODS FOR GENERATING A MODEL DATABASE WITH BLENDSHAPE REPRESENTATION

(71) Applicant: Electronic Arts Inc., Redwood City, CA (US)

(72) Inventors: Igor Borovikov, Foster City, CA (US); David Auclair, Orlando, FL (US); Mihai Anghelescu, Coquitlam (CA); Harold Chaput, Belmont, CA (US)

(73) Assignee: Electronic Arts Inc., Redwood City, CA (US)

( * ) Notice: Subject to any disclaimer, the term of this patent is extended or adjusted under 35 U.S.C. 154(b) by 227 days.

(21) Appl. No.: 18/125,933

(22) Filed: Mar. 24, 2023

(65) Prior Publication Data

US 2024/0320920 A1 Sep. 26, 2024

(51) Int. Cl.
*G06T 17/20* (2006.01)
(52) U.S. Cl.
CPC ................... *G06T 17/205* (2013.01)
(58) Field of Classification Search
CPC .................................................. G06T 17/205
See application file for complete search history.

(56) References Cited

U.S. PATENT DOCUMENTS

| 2006/0028466 A1* | 2/2006 | Zhou ............... G06T 17/205 345/420 |
| 2013/0121409 A1* | 5/2013 | Bourdev ............ G06V 40/172 375/E7.2 |
| 2018/0225882 A1* | 8/2018 | Varanasi .............. G06T 11/60 |
| 2019/0073826 A1* | 3/2019 | Bailey ................ G06T 17/205 |
| 2019/0266796 A1* | 8/2019 | Comer .................. B63B 79/10 |
| 2020/0226821 A1* | 7/2020 | Ma, III ............... G06V 40/174 |
| 2021/0327116 A1* | 10/2021 | Wei ..................... G06T 17/20 |
| 2022/0058870 A1* | 2/2022 | Cong ................... G06T 5/50 |
| 2022/0262073 A1* | 8/2022 | Bailey ................. G06T 19/20 |

(Continued)

OTHER PUBLICATIONS

Wikipedia. "Gram-Schmidt process" (Sep. 8, 2021) (available at: https://web.archive.org/web/20211120190415/https://en.wikipedia.org/wiki/Gram%E2%80%93Schmidt_process).

(Continued)

*Primary Examiner* — Phuc N Doan
(74) *Attorney, Agent, or Firm* — Leydig, Voit & Mayer, Ltd.

(57) ABSTRACT

A method, computer-readable storage medium, and device for generating a master representation of input models. The method comprises: receiving a first base mesh and a second base mesh, wherein the first base mesh has a first topology and is associated with a first set of blendshapes to deform the first base mesh, the second base mesh has a second topology and is associated with a second set of blendshapes to deform the second base mesh, and the second topology is different from the first topology; combining the first topology and the second topology into a combined mesh topology representation; combining the first set of blendshapes and the second set of blendshapes into a combined blendshape representation; and outputting the combined mesh topology representation and the combined blendshape representation as a master representation, wherein the master representation can be queried with a target topology and blendshape.

17 Claims, 7 Drawing Sheets

(56) References Cited

U.S. PATENT DOCUMENTS

| | | | |
|---|---|---|---|
| 2023/0237753 A1* | 7/2023 | Bradley | G06T 13/40 345/419 |
| 2023/0260186 A1* | 8/2023 | Winberg | G06T 7/344 345/473 |

OTHER PUBLICATIONS

Wikipedia. "Morph target animation" (Apr. 9, 2021) (available at: https://web.archive.org/web/20220321064515/https://en.wikipedia.org/wiki/Morph_target_animation).

* cited by examiner

SYSTEMS AND METHODS FOR GENERATING A MODEL DATABASE WITH BLENDSHAPE REPRESENTATION

FIELD

This disclosure generally relates to computer graphics and, more particularly, to systems and methods for generating a model database with blendshape representation.

BACKGROUND

In computer-generated graphics applications, such as video games or animated films, characters in the graphics application typically comprise 3D (three-dimensional) character models. In the context of video games, an in-game character model may include hundreds of parameters. The parameters can give the in-game character a distinct appearance.

In video game development, it is common to create, maintain, and query a database of high-fidelity models of human heads to be used for game characters. The head models may have different topologies depending on the game title or the source of the model. For example, the head models may be artist-authored, may come from various scanning techniques, or may use different base shapes as a starting point for manual modeling.

In some implementations, a given head model can be associated with a set of blendshapes. A blendshape, as used herein, is a construct used to deform geometry to create a specific look for a base mesh. A blendshape (e.g., representing different facial expressions or different face shapes having the same topology) may contain multiple "deformed" versions of a base mesh, and blends them together with a neutral version of the base mesh. Blendshapes allow for the base mesh to take on a variety of appearances without needing to create many separate models. The blendshape technique can also be used to create animations by interpolating between blendshapes.

In some instances, a future release of a given game may wish to reuse a character from a prior release of the game, or an entirely different game may wish to reuse a character from another game. However, often a topology of a character model and a set of blendshapes for the character model in the new game may be different than the topology and blendshapes of the character model to be reused. Artists are forced to manually update parameters of the new character model to match the appearance of the character to be reused using the available blendshapes for the new character model, which could have a different topology.

However, manually creating a suitable representation of a custom character that accurately depicts a desired reference character using a different topology and a different set of blendshapes is difficult and time consuming. Some level of artistic competence is usually needed to obtain a good result. In some cases, however, the set of blendshapes available for the new topology may not be sufficient to achieve the desired look, as not every shape may be representable by the set of blendshapes available. In such a case, new blendshapes may need to be created to fill the gap, and is some instances it may not be possible to completely fill the gap due to the limitations of the new mesh topology.

SUMMARY

Embodiments of the disclosure provide a method, computer-readable storage medium, and device for generating a master representation of input models. The method comprises: receiving a first base mesh, wherein the first base mesh is a polygonal mesh having a first topology, wherein the first base mesh is associated with a first set of blendshapes to deform the first base mesh; receiving a second base mesh, wherein the second base mesh is a polygonal mesh having a second topology, wherein the second base mesh is associated with a second set of blendshapes to deform the second base mesh, wherein the second topology is different from the first topology; combining the first topology of the first base mesh and the second topology of the second base mesh into a combined mesh topology representation; combining the first set of blendshapes and the second set of blendshapes into a combined blendshape representation; and outputting the combined mesh topology representation and the combined blendshape representation as a master representation, wherein the master representation can be queried with a target topology and blendshape.

Some embodiments further comprise: receiving a query for an output mesh with a target topology and associated blendshape vector; applying the blendshape vector to the combined mesh topology representation to generate a deformed combined mesh topology; applying a mapping to the deformed combined mesh topology to generate a blendshape representation having the target topology; and outputting the blendshape representation having the target topology.

DETAILED DESCRIPTION

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

As described in greater detail herein, embodiments of the disclosure provide a system and method for building and storing compressed models (for example, head models) that are portable between topologies using a parametric approach. Such a parameterization uses an optimal sufficiently rich set of blendshapes over a minimal common target shape topology.

In some embodiments, mapping blendshapes between topologies is equivalent to the basis change of parametric representations and allows for game-independent storage and query of the a model database. The disclosed systems and methods allow for seamless conversion of models between game titles and game versions.

The disclosed embodiments rely on a rigorous automated way of constructing a common topology and blendshapes set for parametric modeling. The disclosed blendshape set may be a superset of the blendshapes required to reproduce models for various titles independently of the underlying mesh topology.

In some embodiments, a master representation is constructed from a set of base meshes and the corresponding blendshapes that is detailed enough to generate a shape with a target topology and a corresponding blendshape with minimal error. In one implementation, the construction of the master representation uses mesh subdivision and refinement. Then, some embodiments interpret the base shape with blendshapes as a complete orthonormal basis in a linear space. The base shape may be treated as 0 of the linear space and the blendshapes are treated as basis vectors. The resulting master representation is a parametric model shareable between different topologies (e.g., different game titles).

Taking the context of video games as an example, the display of a video game is generally a video sequence presented to a display capable of displaying the video sequence. The video sequence typically comprises a plurality of frames. By showing frames in succession in sequence order, simulated objects appear to move. A game engine typically generates frames in real-time response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frame-per-second video, if one frame represents the scene at t=0, then the next frame would represent the scene at t=1/60 second. In some cases, a frame might represent the scene from t=0 to t=1/60, but in the simple case, the frame is a snapshot in time.

A "scene" comprises those simulated objects that are positioned in a world coordinate space within a view pyramid, view rectangular prism or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects with some of the objects being animated, in that the objects appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

In some embodiments, a character may be modeled as a skeleton comprising a plurality of body parts with joint constraints. Joint constraints might include attachment points (some of which might be pivot-able), range of motion, degrees of freedom, masses, and possibly strength limits and distribution of masses. For example, a football player might be modeled with a torso, upper arms, forearms, head, waist, legs, fingers, etc., with the upper arm constrained to remain joined to the forearm at the elbow with less than 180 degrees of joint movement at the elbow. In some embodiments, a skeleton can thus be represented in game data structures as a collection of body part data structures and a collection of joint constraints. A skeleton data structure might include data to hierarchically link body parts, such as pointers to parent and child body parts. A skeleton in an animated motion might further include as part of its state the positions/orientations of skeleton parts, velocity/angular moment and a set of force/torque vectors on some or all body parts for each frame of the animated motion.

Figure 1:
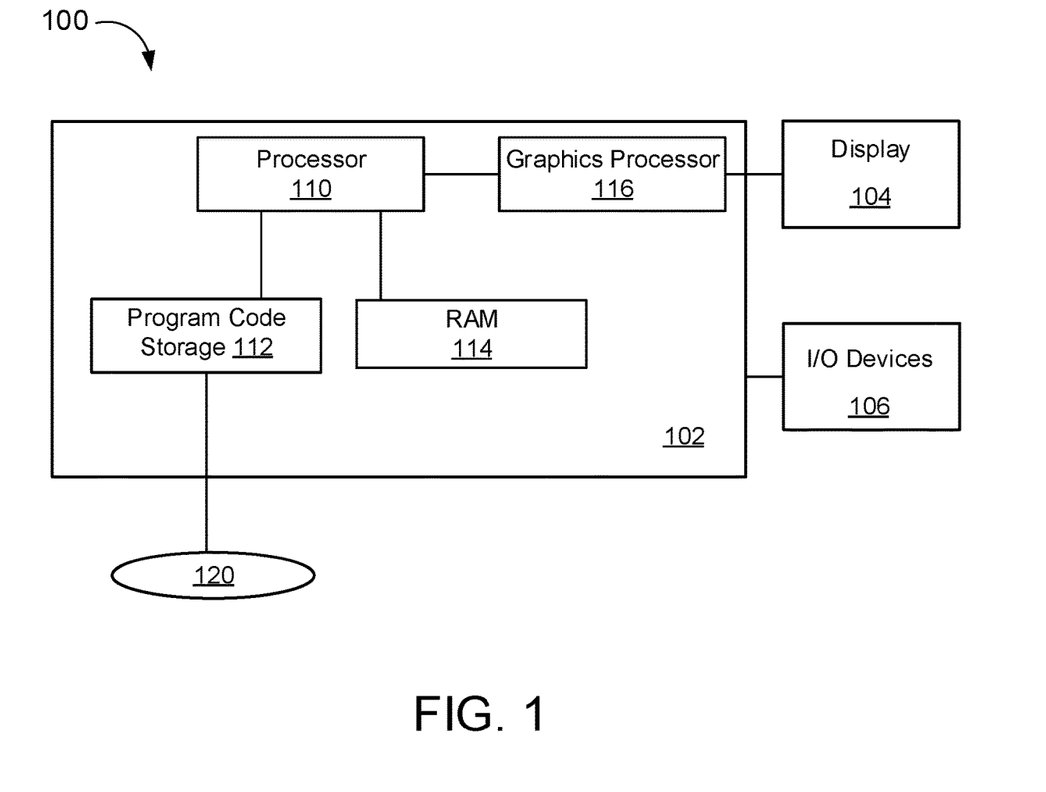
FIG. 1 is a block diagram of a computer system for rendering images, according to aspects of the present disclosure.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
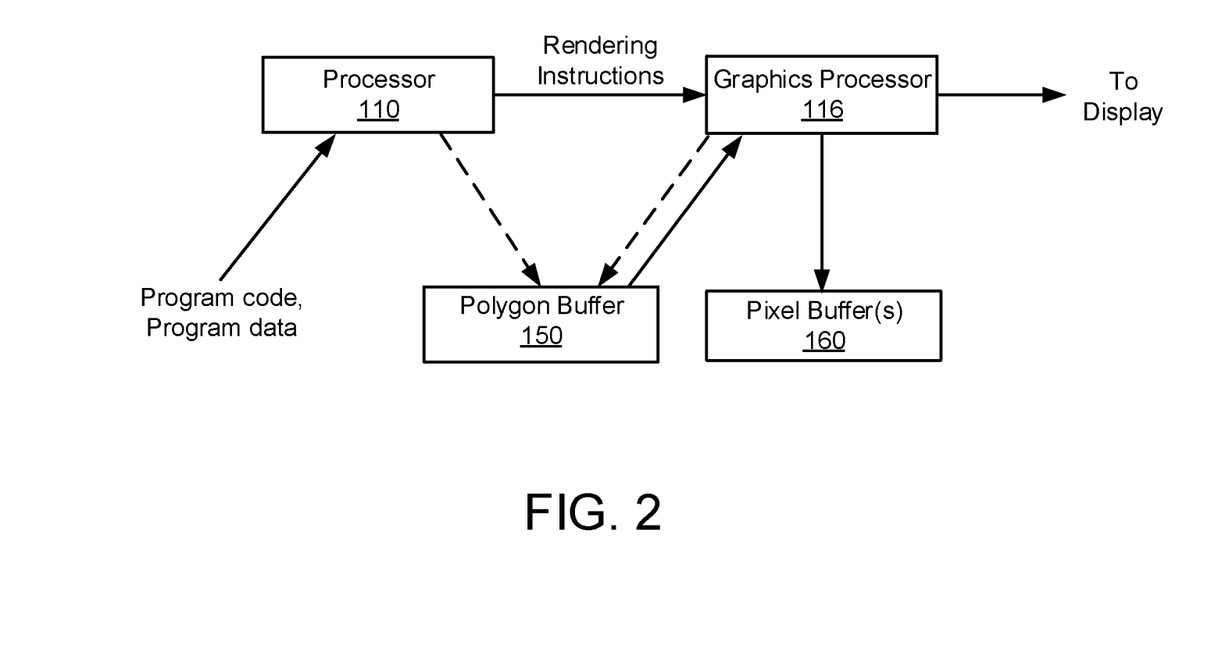
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
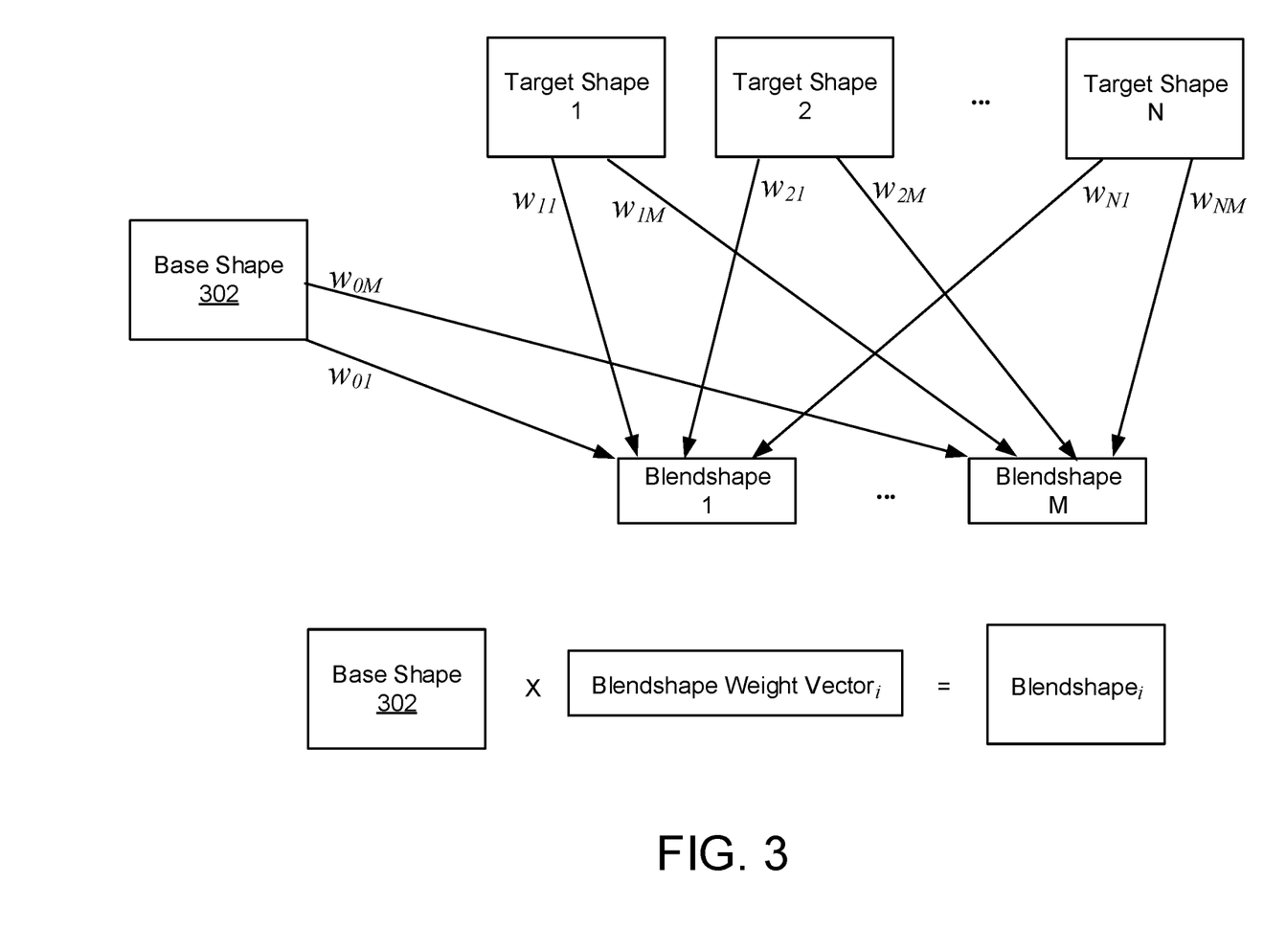
FIG. 3 is a block diagram illustrating a base shape and corresponding blendshapes, according to one embodiment.

FIG. 3 is a block diagram illustrating a base shape 302 and corresponding blendshapes, according to one embodiment. In one embodiment, the base shape 302 is a polygonal mesh. The polygonal mesh comprises a collection of vertices, edges, and faces that define the shape and/or boundary of the base shape 302. The faces of the polygonal mesh may include various polygonal shapes, such as triangles, quadrilaterals, convex polygons, concave polygons, regular polygons (e.g., polygons that may have equal length sides and may have equal angles) and/or irregular polygons (e.g., polygons that may not have equal length sides and may not have equal angles).

In one implementation, the base shape 302 represents a head model. In other embodiments, other parameterized objects are within the scope of the disclosure, such as human bodies, chairs, cars, pets, other parameterizable organic or inorganic things, for example.

In some implementations, the base shape 302 representing a head model could include a variety of facial features. Non-limiting examples include face shape, hair style, ears, eyebrows, eyes, nose, cheeks, mouth, chin, jaw, and facial hair, etc. These facial features are merely examples, and some head models may include more or fewer features. Each of the features of the head model can include parameters that are modifiable to customize the appearance of a character rendered from the corresponding head model.

In some embodiments, blendshapes can be used to create additional models based on the base shape 302. The blendshapes method is a technique for the creation of realistic and semi-realistic three-dimensional (3D) models and animation. The blendshapes method can deform a neutral shape (for example, an expressionless face) of an object to a desired shape. In embodiments of the disclosure, the base shape 302 may represent the neutral shape of a head model. Target shapes (i.e., {target shape 1, target shape 2, ..., target shape N} in FIG. 3) may represent different facial expressions (for example, laugh, frown, pursed lips, closed eyelids, and so forth), different emotions (for example, happy, sad, angry, laughing, crying, scared, surprised, tired, etc.), or different face shape features (for example, thin face, wide face, big nose, big eyes, etc.). In some implementations, each target shape 1 to N in FIG. 3 deforms only a part of the base shape 302 (e.g., left eyebrow raised), or could deform multiple parts of the base shape 302 (e.g., to create an expression of a particular emotion).

Blendshapes (i.e., {blendshape 1 ... blendshape M} in FIG. 3) associated with the base shape 302 can be formed by blending different target shapes 1 to N associated with the base shape 302. For example, a frown target shape can be mixed with a smile target shape to form a blendshape of apologetic expression, or a target shape with pursed lips can be mixed with a target shape of frowning eyes to form a blendshape of determination or a look of disapproval.

In one implementation, a weight vector can be applied to each target shape (and also possibly to the base shape 302) to form a blendshape. In an implementation with N target shapes, a vector for length N can be used to generate a blendshape, where each weight value of the vector corresponds to a different target shape. In some embodiments, two or more blendshapes can be further blended together to generate additional blendshapes (i.e., additional deformations of the base shape 302).

Although just a single base shape 302 and corresponding set of blendshapes are shown in FIG. 3, additional base shapes could be provided with different topologies than the base shape 302. These additional base shapes can be associated with different target shapes and a different set of blendshapes.

Figure 4:
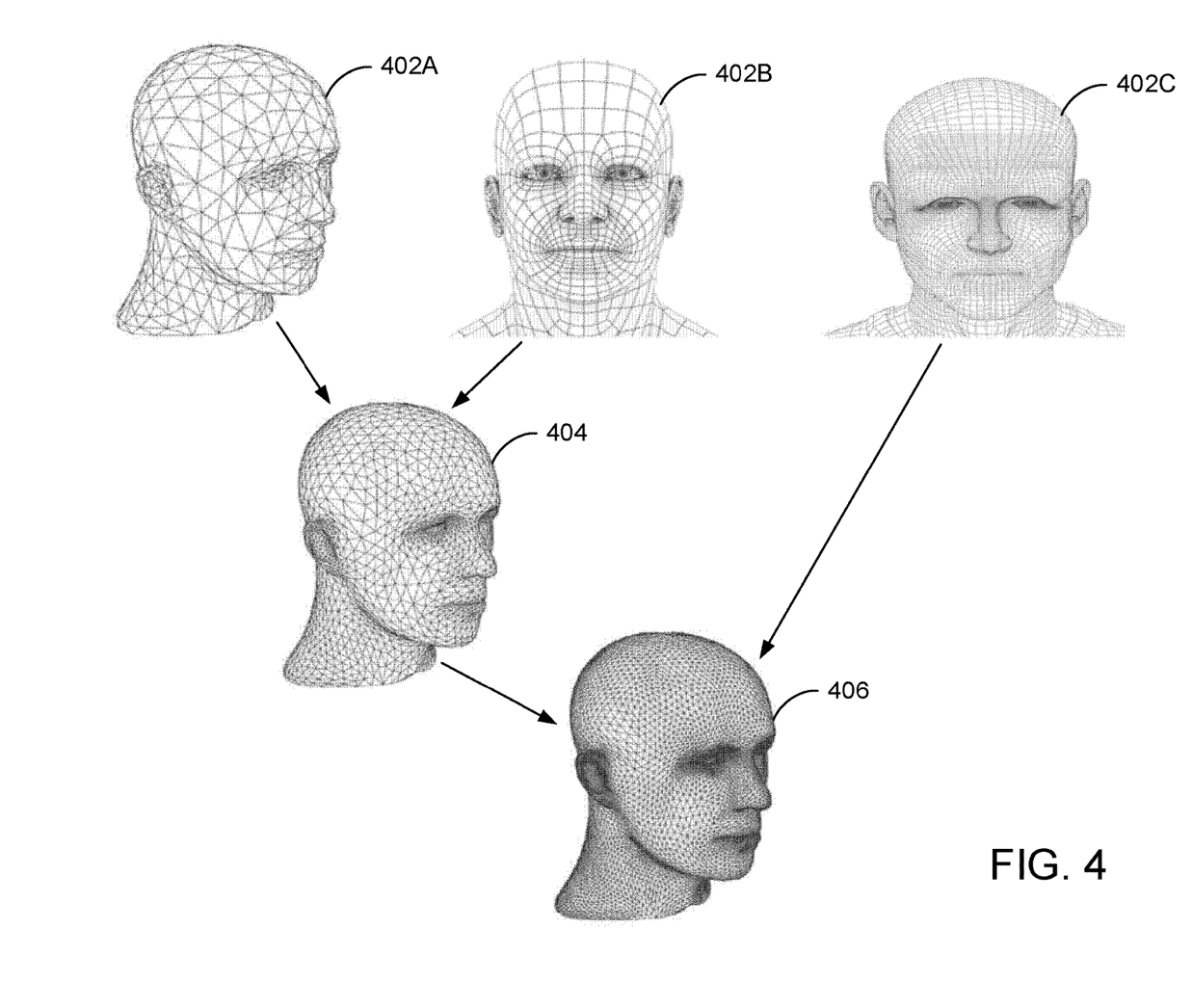
FIG. 4 is a conceptual diagram illustrating combining different mesh topologies into a master mesh representation, according to one embodiment.

FIG. 4 is a conceptual diagram illustrating combining different mesh topologies into a master mesh representation, according to one embodiment. As described herein, embodiments of the disclosure provide a database and data structure for representing any number of input meshes (i.e., base meshes) and their corresponding blendshapes, which can be queried to reconstruct a desired target share and blendshape.

In the example in FIG. 4, three base meshes 402A, 402B, 402C are received as input. Each of the base meshes 402A, 402B, 402C has a different topology than the other base meshes. For example, the number of vertices, number of faces, or types of faces may be different in each of the base meshes 402A, 402B, 402C.

In one implementation, the base meshes 402A, 402B, 402C are combined serially. First, base mesh 402A is combined with base mesh 402B to form intermediate mesh 404. Then, base mesh 402C is combined with intermediate mesh 404 to form a master mesh representation 406.

In one embodiment, for each pair of meshes that is combined, the resulting combined mesh includes the vertices from both meshes and has a topology that is the minimal superset of the meshes being combined. Various techniques could be used to compute such a combined mesh.

In one implementation, faces of a first mesh being combined with a second mesh can be subdivided to create additional vertices for the first mesh. In one implementation, for a set $H\{h_0 \ldots h_R\}$ of base meshes $h_0$ to $h_R$, each base mesh $h_i$ includes vertices (i.e., points) p. Each point p of a base mesh $h_i \in H$ can be a 5 unit vector p uvxyz that include texture coordinates (uv) and 3D coordinates (xyz). In one implementation, an assumption is made that texture coordinates (uv's) are shared among the base meshes, and, for example, take values in the unit square (i.e., $[-1 \ldots 1] \times [-1 \ldots 1]$ square). This assumption of shared uv's also dictates that facial features among different base meshes have the same uv coordinates, and regions of the face (e.g., nose tip) are at a particular uv coordinate (e.g., nose tip is at uv=(0.5, 0.5), or a mouth is found in a specific rectangle, etc.). However, making this assumption is not necessary in some implementations, as some implementations can remap uv spaces between different representations.

In one embodiment, a discretization $D_T(h)$ of $h \in H$ is an (optimal) representation of h with a fixed topology T mesh. Topology T defines triangulation of the mesh (i.e., connectivity of the vertices into triangles or quads). The coordinates of a vertex v approximate locations of the points p on the surface h. Abstract shapes in this definition can be instantiated in computer graphics as discretizations. Given two discretizations $D_{T1}(h)$ and $D_{T2}(h)$, some embodiments can define their mutual refinement by combining together the set of the vertices $v_1$ and $v_2$ into a single set $v_{12}$ $v_1 \cup v_2$ via exclusive union (i.e., removing repetitions) and next running a triangulation procedure (for example, using Delaunay triangulation) to obtain new topology $T_{12}$.

Optimizing $D_{T12}(h)$ to approximate target shape $h_T$ using a loss function (for example, an L2 loss function used to minimize the error which is the sum of the all the squared differences between the true value and the predicted value) for 3D vertex coordinates results in a refinement of the target shape $h_T$. In practice, $h_T$ is not known, so the optimization step can be replaced with finding a weighted average of interpolated values for both meshes $D_{T1}(h_T)$ and $D_{T2}(h_T)$ in order to obtain $D_{T12}(h_T)$. Intuitively, some embodiments combine knowledge of the target surface from both discretizations to build a refined one.

Although just three base meshes 402A, 402B, 402C are shown in FIG. 4, any number of base meshes can be combined in this manner. In some implementations, one of the base meshes may be an anatomically accurate depiction of a human head. In one embodiment, once a master mesh representation 406 has been generated and an additional base mesh is to be added later, the additional base mesh can be added to the master mesh representation 406 in the same manner. In another embodiment, a machine learning technique can be used to add additional base meshes to the master mesh representation 406 (or when combining meshes at intermediate stages before achieving the master mesh representation 406). In a machine learning approach, the machine learning system can be trained to learn how to blend two meshes of different topologies together and propose a solution to assist in combining two base meshes based on how prior base meshes were combined. The proposed solution from the machine learning output can, in some implementations, be optimized to provide the combined mesh.

The master mesh representation 406, therefore, maintains a mapping from the master mesh representation 406 to any target mesh topology that was used as input to form the master mesh representation 406. To obtain a specific target mesh topology from the master mesh representation 406, the mapping is applied to the master mesh representation 406 to obtain the target mesh topology.

In one embodiment, if a request is received for a target topology and blendshape weights to generate a specific character model, and the target topology is the same as base mesh topology of the specific character model being requested, then the target topology can be extracted using the mapping from the master mesh representation to the target topology. Then the blendshape weights can be applied directly to the retrieved target topology, since the target topology is the same as base mesh topology of the specific character model being requested. In such an implementation, blendshapes are not necessarily needed to be encoded in the master mesh representation.

However, in order for a specific character model (i.e., with a first topology) and corresponding blendshapes to be portable to different game titles that use a different topology and blendshapes, the blendshapes of the input models are also encoded in the master representation.

Some embodiments of the disclosure can create a blendshape basis to include in a master representation that includes both a combined mesh topology of the various input base meshes along with a combined blendshape representation of the corresponding blendshapes of each input base mesh.

In one embodiment, in the combined blendshapes approach, a blendshape basis is defined as $B_T = \{b_i; i=1, \ldots, n\}$, where by is a smooth deformation of an underlying mesh over a compact set of vertices. Construction of $B_T$ is an optimization problem that minimizes discretization loss represented in the basis $B_T$ over the set of target (output) shapes S. Since Sis a concrete set of discretized shapes, the construction of Br can be performed computationally by simultaneous optimization of the shapes $b_i$ and their domains in order to minimize approximation error over S. Additionally, the optimization may include Gram-Schmidt orthogonalization to ensure the basis $B_T$ is completely orthonormal. In some implementations, the computational procedure of building $B_T$ is similar to constructing a discrete wavelet basis of 3D functions over 2D texture space.

In some embodiments, the projections of the new blendshapes into new sub-segments satisfy the condition of being able to reconstruct the original blendshape by summing up their displacements. In such a way, it allows splitting the corresponding parametric model weights accordingly to reproduce the same parametric mesh as with the previous segmentation. For example, if a previous segment contained two vertices with the blendshape consisting of two displacement vectors B1=[xyz=(1, 1, 1) at vertex 1, xyz=(1, 1, 1) at vertex 2], then the subdivision to two segments consisting of only a single vertex could result in blendshapes B11=[xyz=(1, 0.5, 0) at vertex 1] and B12=[xyz=(0,0.5, 1) at vertex 2]. As such, summing the two new blendshapes across vertices 1 and 2, would achieve get the original blendshape: B11+B12=B1.

In some implementations, one consideration when generating the blendshapes basis is avoiding overcompleteness. For a parametric model, an overcomplete set of blendshapes allows to construct the same target output using different weights. Extending the example above, suppose that:

$$B1 = [xyz = (1, 1, 1) \text{ at vertex } 1, xyz = (1, 1, 1) \text{ at vertex } 2], \text{ and}$$

$$B2 = [xyz = (2, 2, 2) \text{ at vertex } 1, xyz = (2, 2, 2) \text{ at vertex } 2].$$

Fitting the basis of B1 and B2 to any target is ambiguous because B2=2*B1, i.e., the blendshapes are not independent. If a region in the blendshape construction was not actually subdivided between iterations, then we have to be careful about how we construct the additional blendshape to avoid overcompleteness. Some implementations may require linear independence of the new blendshapes from the previous iteration and the next iteration.

Similar to the refinement described above when combining topologies of two meshes, some embodiments can refine the blendshapes basis. A refinement $B_{T12}$ can be defined as $B_{T12} B_{r1} \uplus B_{T1}$ of the blendshape basis $B_{T1}$ and $B_{T1}$ for two discretizations $D_{T1}$ and $D_{T2}$. The procedure may include performing Gram-Schmidt normalization over the combined set of blendshapes over the refined topology $T_{12}$.

Using the introduced definitions, some embodiments can define operations on an entire set of different shapes that use different topologies for head models as follows. For the pre-existing shapes $S_T$ that are in a heads library and that may use different topologies, the minimal common topology refinement T* is generated. Intuitively, the minimal common topology is the minimal refined topology that supersedes all other topologies. Similarly, we construct blendshape basis B* corresponding to T*. The pair of (B*, T*) can then be used to parameterize the various input base meshes along with a combined blendshape representation of the corresponding blendshapes of each input base mesh.

Figure 5:
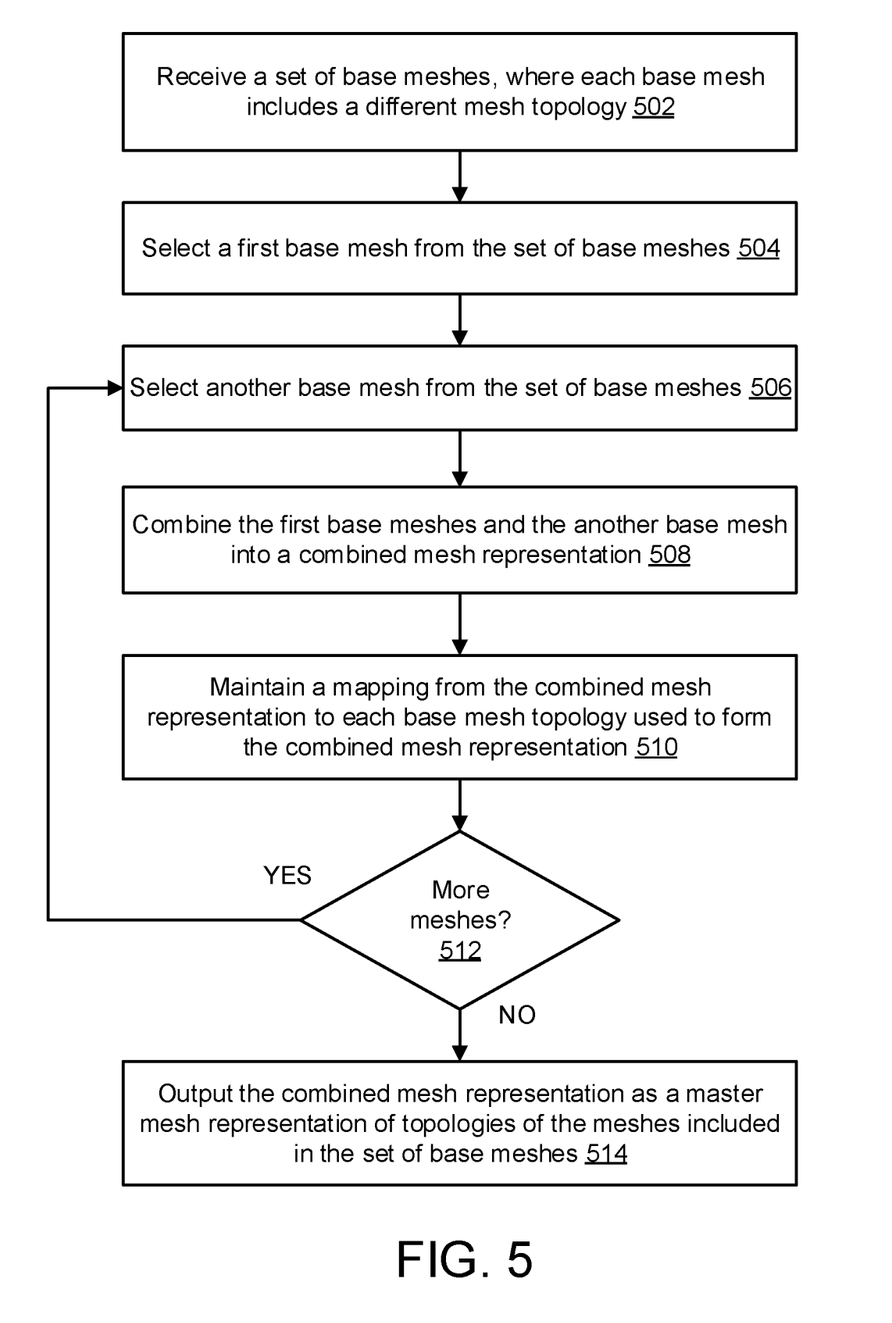
FIG. 5 is a flow diagram of method steps for generating a master mesh representation, according to one embodiment.

FIG. 5 is a flow diagram of method steps for generating a master mesh representation, according to one embodiment. In various implementations, the method can be performed by the processor 110, the graphics processor 116, or a combination of the processor 110 and the graphics processor 116.

As shown, the method begins at step 502, where a processor receives a set of base meshes, where each base mesh includes a different mesh topology. In one implementation, the set of base meshes represents head models. In other implementations, the set of base meshes may represent any parameterizable object.

At step 504, the processor selects a first base mesh from the set of base meshes. At step 506, the processor selects another base mesh from the set of base meshes.

At step 508, the processor combines the first base meshes and the another base mesh into a combined mesh representation. As described above, the combined mesh representation includes the vertices from both the first base mesh and the another base mesh, and has a topology that is the minimal superset of the first base meshes and the another base mesh being combined.

At step 510, the processor maintains a mapping from the combined mesh representation to each base mesh topology used to form the combined mesh representation.

At step 512, the processor determines whether there are any more meshes to process. If yes, the method returns to step 506. If no, the method proceeds to step 514.

At step 514, the processor outputs the combined mesh representation as a master mesh representation of topologies of the meshes included in the set of base meshes.

Figure 6:
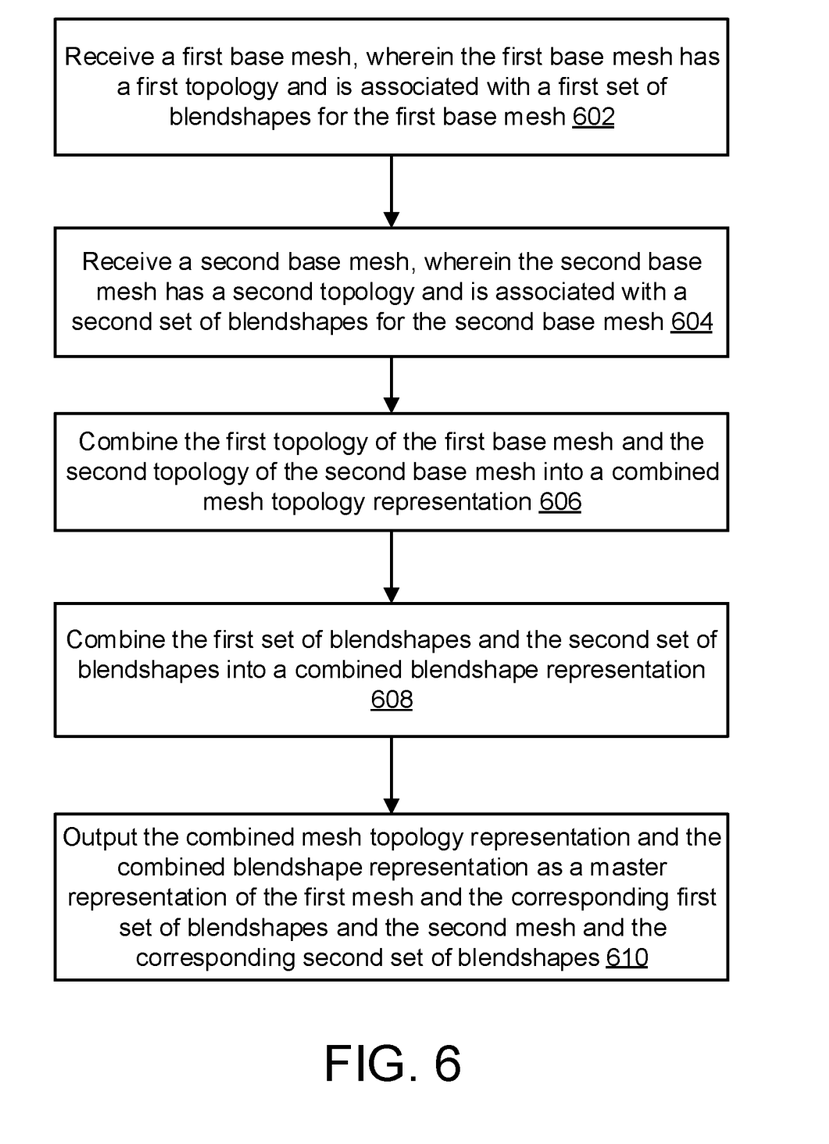
FIG. 6 is a flow diagram of method steps for including blendshapes in a master mesh representation, according to one embodiment.

FIG. 6 is a flow diagram of method steps for including blendshapes in a master mesh representation, according to one embodiment. In various implementations, the method can be performed by the processor 110, the graphics processor 116, or a combination of the processor 110 and the graphics processor 116.

As shown, the method begins at step 602, where a processor receives a first base mesh, wherein the first base mesh has a first topology and is associated with a first set of blendshapes for the first base mesh. At step 604, the processor receives a second base mesh, wherein the second base mesh has a second topology and is associated with a second set of blendshapes for the second base mesh.

At step 606, the processor combines the first topology of the first base mesh and the second topology of the second base mesh into a combined mesh topology representation. In one implementation, combining the first topology of the first base mesh and the second topology of the second base mesh into the combined mesh topology representation can be done using the method of FIG. 5.

At step 608, the processor combines the first set of blendshapes and the second set of blendshapes into a combined blendshape representation. As described above, in one implementation, the combined blendshape representation defines a blendshape basis $B_T=\{b_i; i=1 \ldots ,n\}$, where $b_i$ is a smooth deformation of an underlying mesh over a compact set of vertices. Construction of Bris an optimization problem that minimizes discretization loss represented in the basis $B_T$ over the set of target (output) shapes S. Since S is a concrete set of discretized shapes, the construction of $B_T$ can be performed computationally by simultaneous optimization of the shapes $b_i$ and their domains in order to minimize approximation error over S. Additionally, the optimization may include Gram-Schmidt orthogonalization to ensure the basis $B_T$ is completely orthonormal. In some embodiments, the projections of the new blendshapes into new sub-segments satisfy the condition of being able to reconstruct the original blendshape by summing up their displacements. In such a way, it allows splitting the corresponding parametric model weights accordingly to reproduce the same parametric mesh as with the previous segmentation. Also, in some implementations, the blendshape basis is optimized to avoid overcompleteness.

At step 610, the processor outputs the combined mesh topology representation and the combined blendshape representation as a master representation of the first mesh and the corresponding first set of blendshapes and the second mesh and the corresponding second set of blendshapes. The master representation can then be queried with a target shape and set of blendshape weight to achieve a desired character representation independent of the topology of the target shape.

Figure 7:
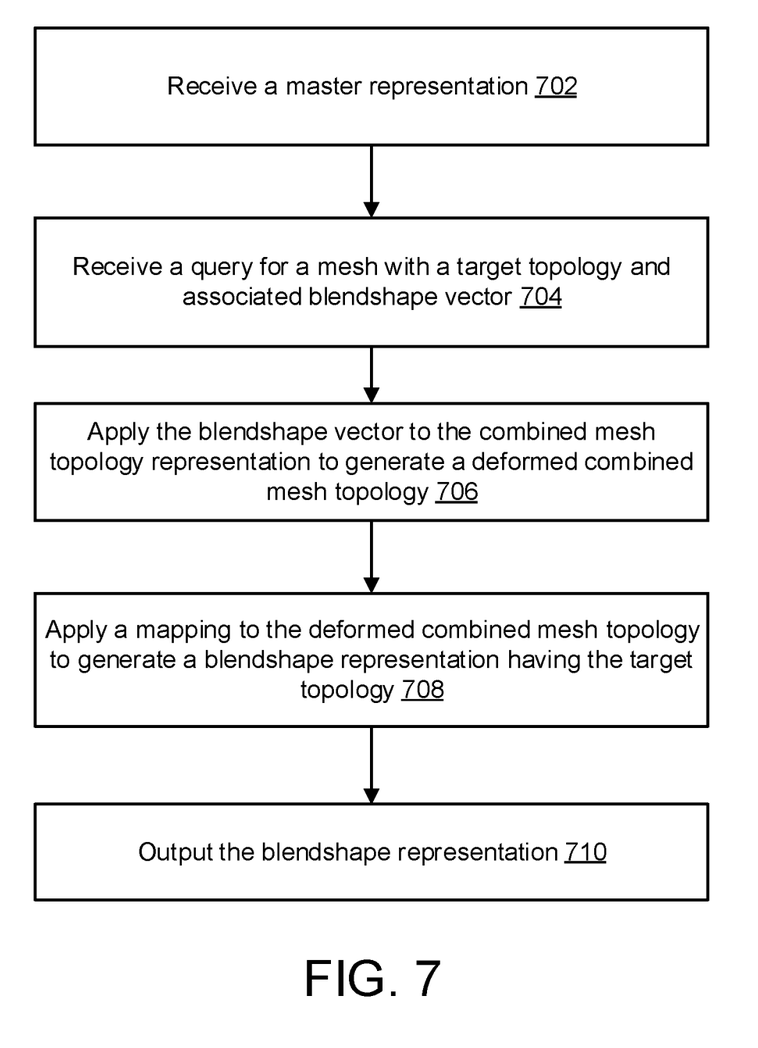
FIG. 7 is a flow diagram of method steps for reconstructing a blendshape representation from a master mesh representation, according to one embodiment.

FIG. 7 is a flow diagram of method steps for reconstructing a blendshape representation from a master mesh representation, according to one embodiment. In various implementations, the method can be performed by the processor 110, the graphics processor 116, or a combination of the processor 110 and the graphics processor 116.

As shown, the method begins at step 702, where a processor receives master representation. The master representation may have been generated using the method of FIG. 6. The master representation includes a combined mesh topology representation and a combined blendshape representation that can represents the various mesh topologies of the input meshes used to construct the master representation, along with the associated blendshapes of the input meshes.

At step 704, the processor receives a query for a mesh with a target topology and associated blendshape vector. In one embodiment, the target topology is the same as the topology of one of the input meshes used to generate the master representation. In other embodiments, the target topology may be an entirely new topology not used to generate the master representation.

At step 706, the processor applies the blendshape vector to the combined mesh topology representation to generate a deformed combined mesh topology. In one embodiment, the blendshape vector may be first parameterized into a format corresponding to a blendshape basis of the combined blendshape representation before being applied to the combined mesh topology representation to generate the deformed combined mesh topology.

At step 708, the processor applies a mapping to the deformed combined mesh topology to generate a blendshape representation having the target topology.

At step 710, the processor outputs the blendshape representation having the target topology.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for generating a master representation of input models, the method comprising:
   receiving, by one or more processors, a first base mesh, wherein the first base mesh is a polygonal mesh having a first topology, wherein the first base mesh is associated with a first set of blendshapes to deform the first base mesh;
   receiving, by the one or more processors, a second base mesh, wherein the second base mesh is a polygonal mesh having a second topology, wherein the second base mesh is associated with a second set of blendshapes to deform the second base mesh, wherein the second topology is different from the first topology;

combining, by the one or more processors, the first topology of the first base mesh and the second topology of the second base mesh into a combined mesh topology representation;

combining, by the one or more processors, the first set of blendshapes and the second set of blendshapes into a combined blendshape representation, wherein combining the first set of blendshapes and the second set of blendshapes into the combined blendshape representation comprises generating a blendshape basis for the combined blendshape representation that minimizes a discretization loss represented in the blendshape basis over a set of target mesh topologies, wherein the set of target mesh topologies includes the first topology and the second topology; and outputting, by the one or more processors, the combined mesh topology representation and the combined blendshape representation as a master representation, wherein the master representation can be queried with a target topology and associated blendshape vector.

2. The method according to claim 1, wherein the first base mesh and the second base mesh represent head models.

3. The method according to claim 1, wherein the first topology and the first set of blendshapes correspond to characters of a first game title, and the second topology and the second set of blendshapes correspond to characters of a second game title.

4. The method according to claim 1, further comprising:
receiving a query for an output mesh with the target topology and associated blendshape vector;
applying the blendshape vector to the combined mesh topology representation to generate a deformed combined mesh topology;
applying a mapping to the deformed combined mesh topology to generate a blendshape representation having the target topology; and
outputting the blendshape representation having the target topology.

5. The method according to claim 4, wherein the target topology is the same as the first topology or the second topology.

6. The method according to claim 1, wherein combining the first topology of the first base mesh and the second topology of the second base mesh into the combined mesh topology representation comprises:
including vertices from the first topology and vertices from the second topology to generate a topology of the combined mesh topology representation that is a minimal superset of the vertices from the first topology and the vertices from the second topology.

7. A non-transitory computer-readable storage medium storing instructions that, when executed by one or more processors, causes a computing device to generate a master representation of input models, by performing the steps of:
receiving a first base mesh, wherein the first base mesh is a polygonal mesh having a first topology, wherein the first base mesh is associated with a first set of blendshapes to deform the first base mesh;
receiving a second base mesh, wherein the second base mesh is a polygonal mesh having a second topology, wherein the second base mesh is associated with a second set of blendshapes to deform the second base mesh, wherein the second topology is different from the first topology;

combining the first topology of the first base mesh and the second topology of the second base mesh into a combined mesh topology representation;

combining the first set of blendshapes and the second set of blendshapes into a combined blendshape representation, wherein combining the first set of blendshapes and the second set of blendshapes into the combined blendshape representation comprises generating a blendshape basis for the combined blendshape representation that minimizes a discretization loss represented in the blendshape basis over a set of target mesh topologies, wherein the set of target mesh topologies includes the first topology and the second topology; and outputting the combined mesh topology representation and the combined blendshape representation as a master representation, wherein the master representation can be queried with a target topology and associated blendshape vector.

8. The computer-readable storage medium according to claim 7, wherein the first base mesh and the second base mesh represent head models.

9. The computer-readable storage medium according to claim 7, wherein the first topology and the first set of blendshapes correspond to characters of a first game title, and the second topology and the second set of blendshapes correspond to characters of a second game title.

10. The computer-readable storage medium according to claim 7, the steps further comprising:
receiving a query for an output mesh with the target topology and associated blendshape vector;
applying the blendshape vector to the combined mesh topology representation to generate a deformed combined mesh topology;
applying a mapping to the deformed combined mesh topology to generate a blendshape representation having the target topology; and
outputting the blendshape representation having the target topology.

11. The computer-readable storage medium according to claim 10, wherein the target topology is the same as the first topology or the second topology.

12. The computer-readable storage medium according to claim 7, wherein combining the first topology of the first base mesh and the second topology of the second base mesh into the combined mesh topology representation comprises:
including vertices from the first topology and vertices from the second topology to generate a topology of the combined mesh topology representation that is a minimal superset of the vertices from the first topology and the vertices from the second topology.

13. A device for generating a master representation of input models, the device comprising:
a memory storing instructions; and
one or more processors configured to the execute the instructions to cause the device to:
receive a first base mesh, wherein the first base mesh is a polygonal mesh having a first topology, wherein the first base mesh is associated with a first set of blendshapes to deform the first base mesh;
receive a second base mesh, wherein the second base mesh is a polygonal mesh having a second topology, wherein the second base mesh is associated with a second set of blendshapes to deform the second base mesh, wherein the second topology is different from the first topology;

combine the first topology of the first base mesh and the second topology of the second base mesh into a combined mesh topology representation;

combine the first set of blendshapes and the second set of blendshapes into a combined blendshape representation, wherein combining the first set of blendshapes and the second set of blendshapes into the combined blendshape representation comprises generating a blendshape basis for the combined blendshape representation that minimizes a discretization loss represented in the blendshape basis over a set of target mesh topologies, wherein the set of target mesh topologies includes the first topology and the second topology; and output the combined mesh topology representation and the combined blendshape representation as a master representation, wherein the master representation can be queried with a target topology and associated blendshape vector.

14. The device according to claim 13, wherein the first topology and the first set of blendshapes correspond to characters of a first game title, and the second topology and the second set of blendshapes correspond to characters of a second game title.

15. The device according to claim 13, wherein the one or more processors executing the instructions further causes the device to:
receive a query for an output mesh with the target topology and associated blendshape vector;
apply the blendshape vector to the combined mesh topology representation to generate a deformed combined mesh topology;
apply a mapping to the deformed combined mesh topology to generate a blendshape representation having the target topology; and
output the blendshape representation having the target topology.

16. The device according to claim 15, wherein the target topology is the same as the first topology or the second topology.

17. The device according to claim 13, wherein combining the first topology of the first base mesh and the second topology of the second base mesh into the combined mesh topology representation comprises:
including vertices from the first topology and vertices from the second topology to generate a topology of the combined mesh topology representation that is a minimal superset of the vertices from the first topology and the vertices from the second topology.

* * * * *